Oct. 29, 1935.   F. C. FRANK   2,018,953
WHEEL
Filed Aug. 27, 1932
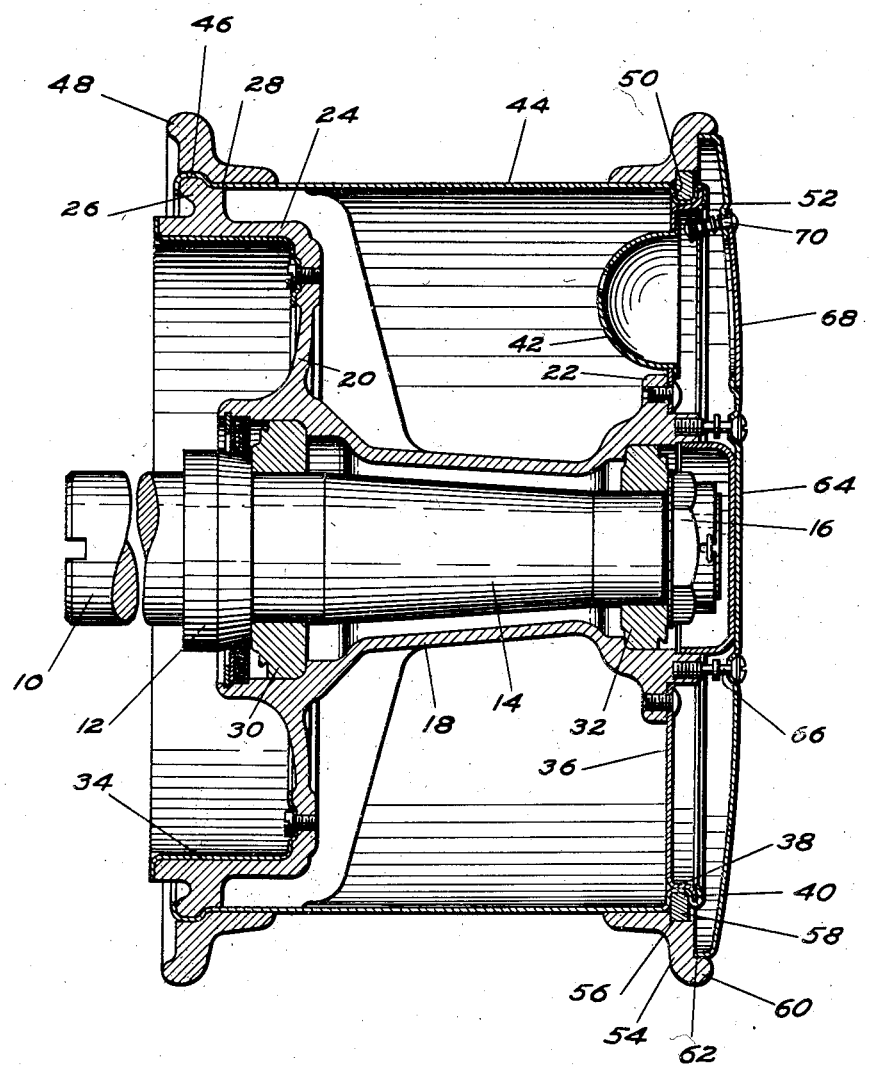
INVENTOR.
FREDERICK C. FRANK
BY
ATTORNEY.

Patented Oct. 29, 1935

2,018,953

UNITED STATES PATENT OFFICE 2,018,953

WHEEL

Frederick C. Frank, South Bend, Ind., assignor to Bendix Aviation Corporation, South Bend, Ind., a corporation of Delaware Application August 27, 1932, Serial No. 630,737

2 Claims. (Cl. 301—6)

This invention relates to wheels and more particularly to wheels for aircraft.

Broadly, the invention comprehends a wheel including relatively few parts which may be easily and quickly assembled to provide a rigid structure at a relatively low cost.

In the illustrated embodiment, the invention includes an aluminum casting including a hub having a radial flange supporting a drum provided with a circumferential flange having a shoulder. The casting also has a small radial flange to which is suitably secured a radial load carrying disc. The flange on the brake drum, and the radial load carrying disc supports a stream line rim, although other types of rims may be employed with equally good effect.

The edge of the rim supported by the flange on the drum is turned to embrace the flange, and is secured thereto by a tire retaining ring slipped over the ring. The other edge of the rim is provided with a circumferential groove or slot and that portion of the rim adjacent this groove is turned to embrace the radial load carrying disc. A tire retaining ring is slipped on the rim and is held against displacement by a split ring seated in the groove. The structure embodies various other features which are considered highly desirable.

An object of the invention is to provide a wheel of exceedingly cheap and simple structure, comprising relatively few parts which may be easily and quickly assembled.

Another object of the invention is to provide a wheel in which the amount of required machine operation on the parts during manufacture shall be materially reduced.

Another object of the invention is to provide a wheel of relatively light yet rigid structure, having means affording ease in mounting or demounting a tire.

A feature of the invention is a single casting including a hub having a flange supporting a drum provided with a centrifugal flange for supporting a rim.

Another feature of the invention is a wheel including a drum having a flange and a tire retaining ring arranged to clamp or secure an interposed rim.

Another feature of the invention is a radial load carrying disc having a shoulder formed adjacent the periphery thereof, and a rim having a slot or groove adjacent one edge seated on the shoulder, with its edge turned to embrace the radial load carrying disc.

Other objects and features of the invention will appear from the following description taken in connection with the drawings, which form a part of this specification, and in which:

The drawing is a vertical sectional view of a wheel illustrating the various parts that go to make up the present invention.

Referring to the drawing for more specific details of the invention, 10 represents an axle having a shoulder 12, and a spindle 14, threaded to receive a retaining nut 16 and positioned for rotation on the spindle is a wheel embodying the invention.

As shown, the wheel comprises a single aluminum casting including a hub 18 having radial flanges 20 and 22. The radial flange 22 is formed with a drum 24 having a circumferential flange 26 provided with a shoulder 28. The hub has positioned therein suitable bearings 30 and 32. Bearing 30 engages the collar 12 on the axle and the bearing 32 engages the retaining nut 16.

The radial flange 20 has suitably secured thereto a drum liner 34 which may be of any preferred type. This liner forms no part of the present invention and accordingly, a description thereof is deemed unnecessary. The radial flange 22 has suitably secured thereto a radial load carrying disc 36. This disc is provided adjacent its periphery with an offset portion 38 terminating in a radial flange 40. The disc 36 is also provided with an opening having fitted therein a cup 42 in which may house the valve stem of an inner tube.

A tire rim 44 of the stream line type is supported by the flange 26 on the drum 24, and the radial load carrying disc 36. As shown, one edge of the rim 44 is deformed as at 46 to fit snugly on the shoulder 28 and is turned to embrace the flange. A tire retaining ring 48 having an inner periphery complementary to the profile of the shouldered portion of the flange 26, is slipped over the rim to clamp the rim between the tire retaining ring and the flange on the drum.

The other edge of the rim 40 has a circumferential groove 50 arranged to seat on the offset portion 38 on the radial flange 36 and that portion of the rim immediately adjacent the groove is turned as indicated at 52 to embrace the periphery of the radial load carrying disc. A tire retaining ring 54 having a shoulder 56 is slipped on the rim and a split retaining ring 58 seated in the groove 50 retains the retaining ring 54 against displacement.

The retaining ring 54 has a prolongated tire retaining bead 60 in which is formed an annular shoulder 62 adaptable for the reception of a fairing 64, the fairing being retained in position by suitable screws 66 threaded into the hub. This fairing has an opening immediately adjacent the housing 42. The peripheral portion of the fairing defining the opening is offset to receive a cover plate 68 retained in position by a spring pressed fastener 70. This structure makes it possible to slide the cover plate out of position, so that access may be readily had to the valve.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A wheel comprising a casting including a hub having a radial flange supporting a drum provided with a flange, the outer periphery of said flange having stepped cylindrical surfaces forming a shoulder, a rim having an edge deformed to embrace the stepped contour of the flange, and a tire retaining ring having an internal contour complementary to that of said second named flange clamping the rim to the flange said tire retaining ring and stepped flange adapted to securely grip the rim member therebetween when subjected to the axial force of a tire thrust against said ring.

2. A wheel comprising a casting including a hub having at one end a radial flange supporting a drum provided with a flange having a shouldered periphery, a radial disc carried by said hub at the other end having an offset portion and a peripheral flange, a cylindrical rim having one edge deformed outwardly and embracing said shouldered periphery and the other edge being turned to embrace said peripheral flange and having an annular portion provided with a circumferential slot adapted to seat on the disc offset portion adjacent said latter edge, and a pair of tire retaining rings slidable on said cylindrical rim, one of which is adapted to seat against the rim immediately adjacent said shouldered periphery, and the other of which is adapted to engage a split ring lock seated in said annular circumferential slot.

FREDERICK C. FRANK.